United States Patent [19]

Reed

[11] Patent Number: 4,998,372
[45] Date of Patent: Mar. 12, 1991

[54] ARTIFICIAL FISHING LURE

[76] Inventor: Herb Reed, 64 Nutmeg Dr. #A, Meriden, Conn. 06450-2870

[21] Appl. No.: 431,577

[22] Filed: Nov. 3, 1989

[51] Int. Cl.5 .............................................. A01K 85/00
[52] U.S. Cl. .................................................. 43/42.24
[58] Field of Search ................ 43/42.24, 42.45, 42.48, 43/42.11

[56] References Cited

U.S. PATENT DOCUMENTS

| | | | |
|---|---|---|---|
| 3,158,952 | 12/1964 | Creme | 43/42.24 |
| 4,197,667 | 4/1980 | Helfenstine et al. | 43/42.24 |
| 4,653,212 | 3/1987 | Pixton | 43/42.24 |
| 4,856,223 | 8/1989 | Evans | 43/42.24 |

Primary Examiner—Kurt Rowan
Assistant Examiner—James Miner
Attorney, Agent, or Firm—McCormick, Paulding & Huber

[57] ABSTRACT

An artificial fishing lure has a hinged, integral elongate, asymmetrical body of soft, resilient material which has a slightly U-shaped surface and a convex bottom portion. The body of the lure is non-stabilized and moves with compound, unpredictable motion to simulate bait fish. T-shaped hinges may be utilized to connect adjacent segments of the body.

15 Claims, 1 Drawing Sheet

FIG. 3

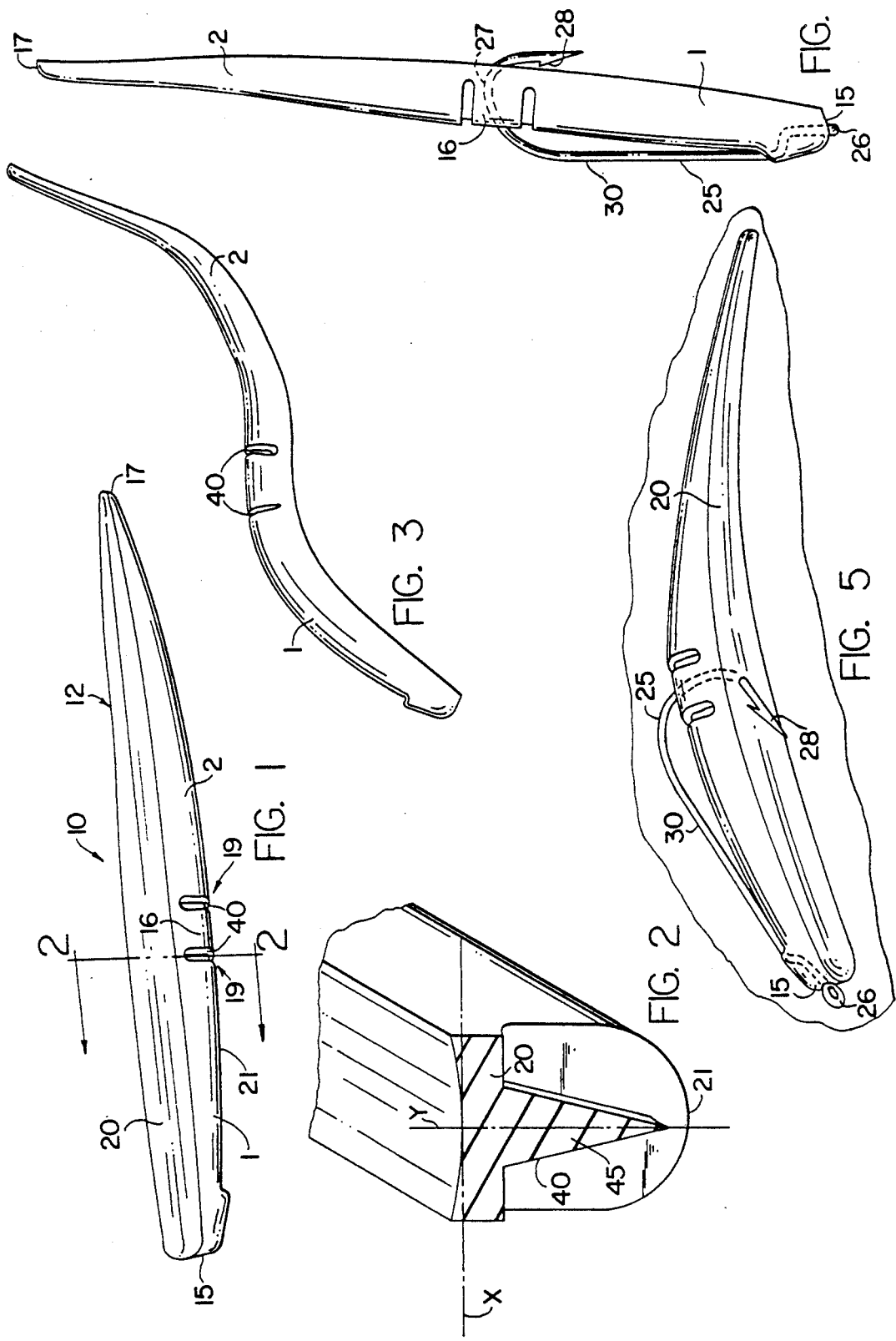

ARTIFICIAL FISHING LURE

BACKGROUND

1. Field of Invention

This invention relates generally to artificial lures and deals more particularly with a flexible artificial lure designed to take advantage of predator fish's recognized or perceived abilities to identify and key on prey-fish that are injured or otherwise disoriented.

2. Description of Background Art

Conventional fishing lure designs usually incorporate shapes that use water resistance to impart some form of action or movement to the lure body. Example shapes are lips that cause the lures to descend as they are pulled through the water; blades that turn in reaction to the forward progress of the lure; curved or flattened tails that ripple when straightened out by water resistance, appendages, etc. Such design factors in the various shapes, while enhancing body movement, impart a rhythm that contrasts with the random, haphazard movements of injured baitfish. While the body of a typical fishing lure moves, bends, vibrates or ripples, the devices which create these movements also promote a degree of directional stability atypical of the movements of injured prey and to which random movements predatory fish respond most readily to.

The present invention utilizes a balanced, streamlined design purposely devoid of such stabilizing features or "action" producing, water resistance driven devices, to eliminate directional stability. This lack of stability allows the lure, as it is moved through or over the water, to move in an overall erratic path, as opposed to the directional path of conventional lures. This random movement more accurately mimics the movements of disoriented prey. The balance of the preferred configuration of the present invention is such that the lure is free to move in random directions, as opposed to the "nose first" motion of conventional lures.

Another general problem associated with the design of artificial plastic fishing lures is their inability to function both on and beneath the surface of the water. Thus, a fisherman generally will need to change lures to accommodate above or below surface fishing.

A yet further problem generally associated with many known artificial lures is their inability to avoid entanglement with vegetation in the water or with the bottom of a body of water.

OBJECTS AND ADVANTAGES

Accordingly, several objects and advantages of the present invention are:

(a) to provide an artificial lure that substantially overcomes the above and other problems associated with known artificial fishing lures;

(b) to provide an artificial lure which moves in an erratic manner when pulled under and on the surface of the water, thereby creating the impression of a wounded bait fish;

(c) to provide a lure which is capable of jumping out of the water like bait fish during a retrieve;

(d) to provide a multiplane lure which can be used both on the surface and under the surface of the water;

(e) to provide a lure which will avoid entanglement with vegetation and will not catch on the bottom of a body of water;

(f) to provide a lure that can be varied in size, dimension, and color to resemble and thus attract a variety of fishes; and (g) to provide a sinking type fishing lure with which surface tension can be used to float the lure on the surface of the water.

SUMMARY OF THE INVENTION

In accordance with the invention, an artificial fishing lure is presented and comprises an elongate, asymmetrical, resilient body having a slightly U-shaped or concave top surface and a plurality of hinges which provide flexure about more than one axis. Although hinged, the lure has a continuous, integral body.

In its preferred embodiment, the lure has two "T" shaped hinges each of which allow for flexure along two axes. Because each hinge has two intersecting axes, it can flex about either axis or in any other resulting vector. The use of a plurality of hinges also allows for independent movement of different segments of the lure.

BRIEF DESCRIPTION OF THE DRAWINGS

FIG. 1 is a perspective view of a preferred embodiment of the artificial fishing lure of the invention.

FIG. 2 is a cross-sectional view of a "T" hinge of the embodiment of FIG. 1 taken along the line 2—2.

FIG. 3 is a side view showing compound flexure of a preferred embodiment.

FIG. 4 is a side view of the embodiment of FIG. 1 with a hook in place as the lure lies on a surface.

FIG. 5 shows an example of a hook and how it operates with the lure.

DETAILED DESCRIPTION OF THE PREFERRED EMBODIMENTS

FIG. 1 shows the artificial fishing lure of the present invention wherein the lure is generally designated 10 and includes a multi-segmented, continuous non-stabilized, integral body 12 having a slightly U-shaped or concave top surface 20 and a bottom 21 having a cross-sectional "U" or rounded "V" shape, with the "V" sharpening and becoming more pronounced towards the trailing terminal end 17 of the lure 10. The lure 10, as shown, has a plurality of segments including leading 1 and trailing 2 segments and a medial portion 16. The body 12 increases in size from the leading terminal end 15 toward the medial portion 16, with the tallest and broadest cross section forward of the center. The medial portion 16 is coupled to the leading and trailing segments by two integral cross-sectional "T" shaped, multidirectional hinges 40, 40. The body 12 decreases in size from the medial portion 16 to the trailing terminal end 17. The leading portion of the lure has a high volume per unit length ratio, thus offsetting the weight of the hook and maintaining the near perfect balance that is integral to the lure's nonstable movement. The slightly concave top surface 20 of the lure provides more action and protects the barb of the hook (see FIG. 5) to keep it away from the bottom surface, thus avoiding snagging.

The recesses in the body 12 generally designated 19,19 and which are created as part of the hinges 40,40 trap and release air bubbles as the lure bends and shakes in the water. The recesses 19,19 by trapping air, also increase buoyancy in the region of the heaviest section of the hook to maintain the overall balance of the lure when the hook is inserted in the body and which balance is integral to the lure's erratic movement through the water. The recesses 19,19 also help cause the lure to ride on top of or dive into a body of water.

The abrupt angle formed by the intersection between the slightly concave top surface and the concave bottom surface allows the lure to float via surface tension even through the body/hook combination, has in its preferred configuration, an effective specific gravity slightly greater than that of water.

FIG. 2 shows a cross-sectional view of a "T" hinge 40. The vertical stem 45 of the hinge 40 allows for flexure along the vertically axis. The horizontal portion of the hinge is defined by the top surface 20 which allows for flexure along the x-axis where the x and y axes are substantially perpendicular to one another. Because of the two axes of flexure, movement through water will cause flexure along the x, y or any combination of both x and y axes. FIG. 2 also illustrates the general "U"/"V" shape of the lure's bottom portion 21.

FIG. 3 shows the body in a flexed position. The two "T" hinges 40,40 allow for independent motion of the leading and trailing segments 1, 2 respectively. The hinges 40,40 are shown by way of example flexed in different directions. The intersecting axes of the respective hinges allow for simultaneous independent movement along the multiple axes to permit the body to move with a compound motion in a variety of different directions as the lure moves in a body of water.

FIG. 4 shows a preferred embodiment of the lure where a hook 25 is placed in the lure. The hook 25 includes a shank 25, line connecting means 26, return bend 27 and barb 28. The return bend 27 terminates in a barb 28 and also preferably passes through a medial portion 16 of the body 12. The line connecting means 26 is offset from the shank 30 and is embedded in the leading end 15 of the body 12 and which shank offset allows the shank 25 to be oriented generally parallel to the body without being embedded into the body. The barb 28 protrudes through the flattened surface 20 and points toward the leading end 15. It is preferred that the barb be nested within the concave back surface to provide additional protection against snagging. The line connecting means or eye 26 is embedded in the leading end 15 of the body and is offset therein. The shank 30 of the hook 25 runs substantially parallel to the longitudinal axis of the body of the lure and is not embedded in the body.

FIG. 5 also shows the lure with a hook 25 in place as it might lie on the bottom surface of a body of water. The lure will lay on its side if it sinks to the bottom of a lake or stream because of its rounded bottom and orientation of the hook and accordingly, barb 28 will be prevented from piercing or snagging the bottom and causing the lure to catch.

In the preferred embodiment, the flexible material is flexible vinyl plastisol, which may be pigmented or colored with polymer materials to lend coloration appropriate to the lure's expressed purposes of imitating natural prey or arousing the response of predatory fish by contrasting with its natural surroundings.

The overall buoyancy of the lure may be varied in manufacture by mixing air bubbles into the plastisol material, or by using a flexible material of different specific gravity.

OPERATION

FIG. 4 shows one configuration of hooking the lure of the present invention. The lure of the present invention offers the most hook protection, i.e. from getting "snagged" to the bottom surface while fishing. This is due to the breadth and concave shape of the top surface of the lure. The arrangement of the hook in this manner provides resistance to snags nearly equal to that achieved by concealing the point of the hook inside the body of a plastic lure in the manner generally referred to in the fishing industry as "Texas Rigging", without interferring with hook penetration into the flesh of the fish as is the case with "Texas Rigging".

As a "weightless" lure, the present invention will walk the surface in a zig-zag motion with short jerks of the rod. After the lure is allowed to dive, a twitch of the rod will cause the lure to dart erratically and unpredictably underwater.

Although the description contains many specificities, these should not be construed as limiting the scope of the invention but as merely providing an illustration of a preferred embodiment of the invention. For example, the lure of the present invention can have just one or more than two hinges.

Thus, the invention is described by way of example rather than limitation.

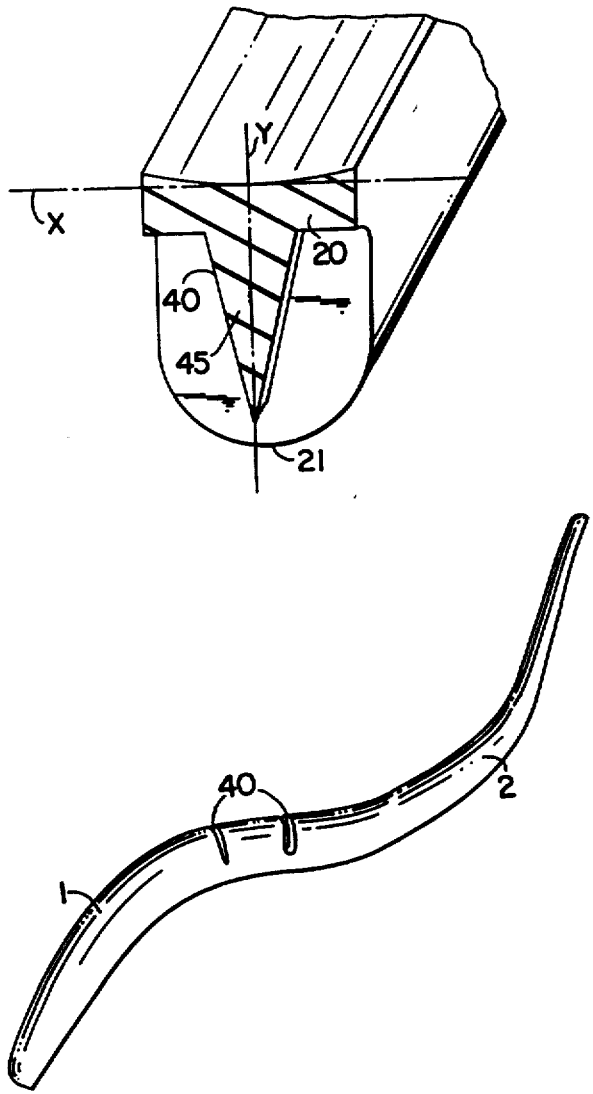

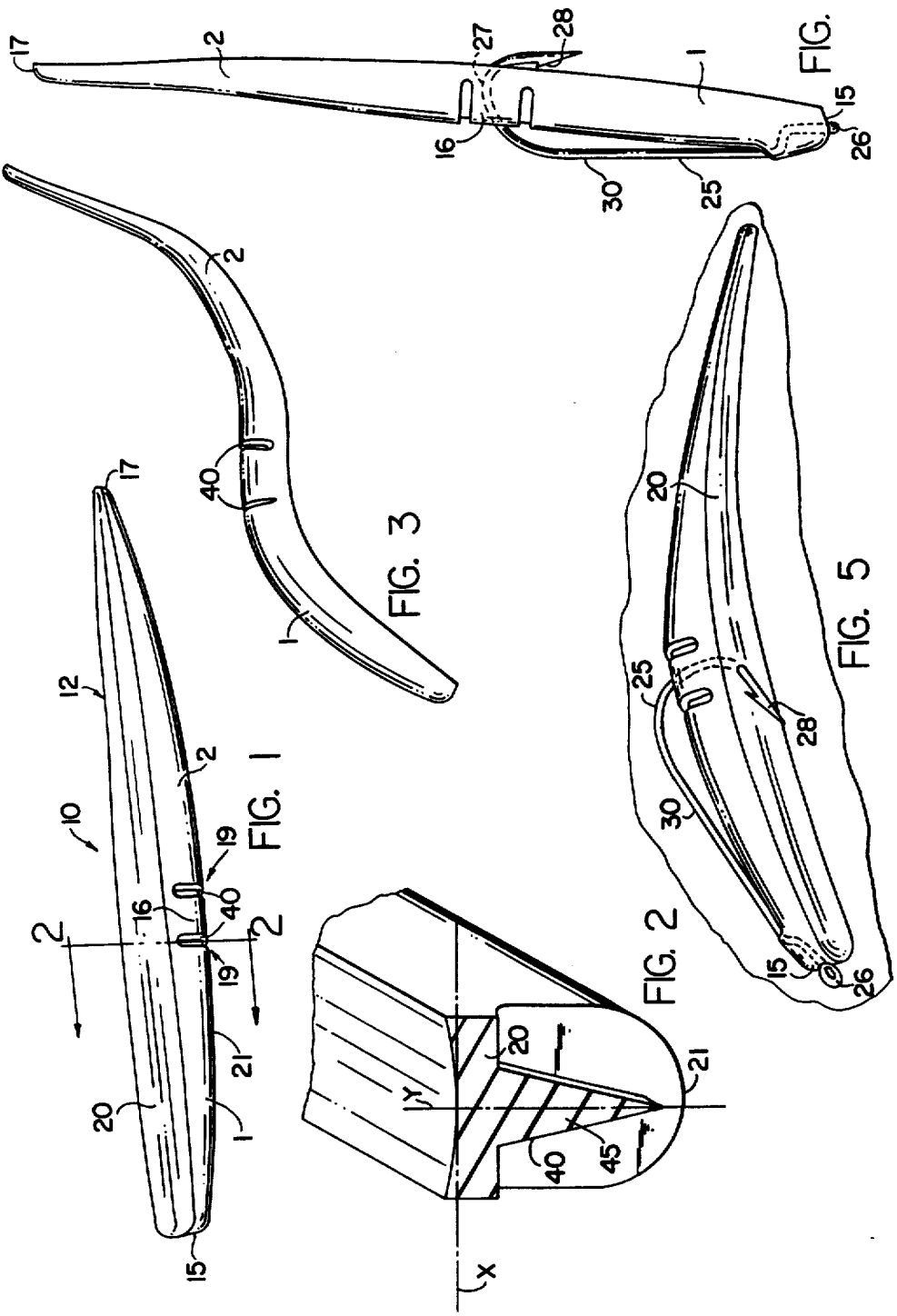

We claim:
1. An artificial fishing lure, comprising:
   an elongate, straight line, radially asymmetrical body of soft flexible elastomeric material;
   said body having a generally U-shaped cross section and a concave top surface, said top surface extending along substantially the entire length of said body;
   said body having a plurality of non-stabilized segments including a leading segment and a trailing segment, each of said segments having a terminating end and a coupling end, and
   hinge means for coupling said leading segment and said trailing segment together at said respective coupling ends, said hinge means comprising intersecting axes of flexure for imparting a compound motion to said plurality of segments as said lure moves through a body of water, said lure moving with a random and erratic motion along an unpredictable path.
2. An artificial fishing lure as defined in claim 1 wherein said hinge means includes at least one integral hinge, said integral hinge further being generally T-shaped.
3. An artificial fishing lure as defined in claim 2 wherein said top surface is substantially uninterrupted along the length of said lure and said top surface partially defines said integral hinge.
4. An artificial fishing lure as defined in claim 1 wherein said hinge means comprises a plurality of integral T-shaped hinges, said hinges being in a spaced relation to one another and located intermediate said leading segment and said trailing segment of said lure.
5. An artificial fishing lure as defined in claim 1 wherein said body further comprises a medial portion and said leading segment and said trailing segment have cross-sectional areas that radially diminish from said medial portion outwards to both of said terminating ends of said segments.
6. An artificial lure as defined in claim 1 further comprising a barbed hook partially embedded in said body; said hook having an arcuate bend terminating in a barb, line connecting means for connecting a fishing line to said hook, a longitudinal shaft for coupling said line connecting means to said barb wherein; said line connecting means is off-set perpendicularly to said shaft;

said hook further being oriented so that said arcuate bend of said hook passes through a medial region of said body;

said hook being further oriented so part of said line connecting means is embedded in said terminating end of said leading segment of said body whereby said longitudinal shaft is not embedded in said body.

7. An artificial fishing lure as defined in claim 1 further including a hook attached to said body wherein the combination of said elastomeric material and hook comprises a unit having a specific gravity slightly greater than the specific gravity of water.

8. An artificial fishing lure as defined in claim 1 wherein said hinges define recesses which temporarily trap and release air bubbles when said lure moves in a body of water thereby increasing the buoyancy at the heaviest section of the lure.

9. A device for attracting fish, said device comprising:

an elongated, straight line, flexible body, said body comprising two terminating ends disposed opposite one another at furthermost points of said body and a plurality of segments displaced along the length of said body and intermediate said two terminating ends, a leading portion of said body comprising a greater average volume per unit length than the rest of said body wherein the cross sectional area of said body, at any point along the length of said body, is bilaterally symmetrical;

a plurality of recesses along the length of said body, said recesses defining areas at which said segments meet each of said plurality of recesses forming T-shaped cross sections in said body, said T-shaped cross sections acting as hinges each of which allow flexure about two orthogonal axes, and said cross sectional area of said body generally decreasing outwardly from a medial portion of said body to said terminal ends of said body.

10. A device for attracting fish as defined in claim 9 wherein said device does not comprise any portions transversely projecting from said body.

11. A device for attracting fish as defined in claim 9 wherein said device is an artificial fishing lure.

12. A device for attracting fish as defined in claim 11 wherein said body has a rounded V-shaped cross section with the V sharpening and becoming more pronounced towards one of said terminating ends.

13. A device for attracting fish as defined in claim 12 wherein said device is devoid of transverse portions projecting from said body.

14. A device for attracting fish as defined in claim 12 wherein said plurality of recesses form hinges which allow independent movement of each segment of said plurality of segments.

15. A device for attracting fish as defined in claim 11 wherein said body comprises a top surface concavely curved transversely to its length and substantially along the length of said body and a bottom surface convexly curved transversely to its length and substantially along the length of said body.

* * * * *

UNITED STATES PATENT AND TRADEMARK OFFICE
CERTIFICATE OF CORRECTION

PATENT NO. : 4,998,372

DATED : March 12, 1991

INVENTOR(S) : Herb Reed

It is certified that error appears in the above-identified patent and that said Letters Patent is hereby corrected as shown below:

The title page should be deleted to appear as per attached title page.

The sheet of drawing should be deleted to be replaced with the attached sheet of drawing.

Column 6, line 24 delete "form hinges which".

Signed and Sealed this

Tenth Day of November, 1992

Attest:

DOUGLAS B. COMER

Attesting Officer

Acting Commissioner of Patents and Trademarks

United States Patent [19]
Reed

[11] Patent Number: 4,998,372
[45] Date of Patent: Mar. 12, 1991

[54] ARTIFICIAL FISHING LURE

[76] Inventor: Herb Reed, 64 Nutmeg Dr. #A, Meriden, Conn. 06450-2870

[21] Appl. No.: 431,577

[22] Filed: Nov. 3, 1989

[51] Int. Cl.⁵ .............................. A01K 85/00
[52] U.S. Cl. ..................................... 43/42.24
[58] Field of Search ........... 43/42.24, 42.45, 42.48, 43/42.11

[56] References Cited

U.S. PATENT DOCUMENTS

| | | | |
|---|---|---|---|
| 3,158,952 | 12/1964 | Creme | 43/42.24 |
| 4,197,667 | 4/1980 | Helfenstine et al. | 43/42.24 |
| 4,653,212 | 3/1987 | Pixton | 43/42.24 |
| 4,856,223 | 8/1989 | Evans | 43/42.24 |

Primary Examiner—Kurt Rowan
Assistant Examiner—James Miner
Attorney, Agent, or Firm—McCormick, Paulding & Huber

[57] ABSTRACT

An artificial fishing lure has a hinged, integral elongate, asymmetrical body of soft, resilient material which has a slightly U-shaped surface and a convex bottom portion. The body of the lure is non-stabilized and moves with compound, unpredictable motion to simulate bait fish. T-shaped hinges may be utilized to connect adjacent segments of the body.

15 Claims, 1 Drawing Sheet